United States Patent
Su et al.

(10) Patent No.: US 9,769,355 B2
(45) Date of Patent: Sep. 19, 2017

(54) METHOD AND APPARATUS FOR GESTURE-BASED DEVICE ACCESS

(71) Applicants: Kabushiki Kaisha Toshiba, Minato-ku (JP); Toshiba TEC Kabushiki Kaisha, Shinagawa-ku (JP)

(72) Inventors: William Su, Riverside, CA (US); Jenny Zhang, Irvine, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 14/981,377

(22) Filed: Dec. 28, 2015

(65) Prior Publication Data

US 2017/0187921 A1   Jun. 29, 2017

(51) Int. Cl.
| | |
|---|---|
| H04N 1/44 | (2006.01) |
| G06F 3/0488 | (2013.01) |
| G06F 3/0482 | (2013.01) |
| H04L 29/08 | (2006.01) |
| H04N 1/00 | (2006.01) |

(52) U.S. Cl.
CPC ......... *H04N 1/4426* (2013.01); *G06F 3/0482* (2013.01); *G06F 3/0488* (2013.01); *H04L 67/025* (2013.01); *H04N 1/00307* (2013.01); *H04N 1/00411* (2013.01); *H04N 1/444* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 6,160,629 | A  * | 12/2000 | Tang ...................... | G06K 15/02 |
| | | | | 358/1.1 |
| 7,782,477 | B2 * | 8/2010 | Kimura ................... | H04N 1/44 |
| | | | | 358/1.15 |
| 8,885,186 | B2 * | 11/2014 | Matsuda .............. | H04N 1/0023 |
| | | | | 358/1.13 |
| 9,430,634 | B1 * | 8/2016 | Dotan ................... | H04L 63/083 |
| 2007/0002368 | A1 * | 1/2007 | Corona ................ | H04N 1/4413 |
| | | | | 358/1.15 |
| 2012/0092718 | A1 * | 4/2012 | Sato ...................... | G06F 3/1207 |
| | | | | 358/1.15 |

* cited by examiner

*Primary Examiner* — Paul F Payer
(74) *Attorney, Agent, or Firm* — Ulmer & Berne LLP

(57) ABSTRACT

A system and method for completing document processing operations between a user device and a document processing device such as multifunction peripheral includes capturing a user gesture at the user device. This gesture is digitized and associated with one or more electronic documents, one or more targeted multifunction peripherals and instructions for processing of the document. This information is communicated to the document processing device where a user inputs a second gesture which is digitized and compared to the first gesture. Sufficient coincidence allows for the document processing operation to proceed.

18 Claims, 6 Drawing Sheets

METHOD AND APPARATUS FOR GESTURE-BASED DEVICE ACCESS

TECHNICAL FIELD

This application relates generally to document processing operations between a user device and a networked document processing device. The application relates more specifically to secure transmission of documents to devices for processing.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). MFPs are used in connection with example embodiments disclosed in detail below, but it is to be appreciated that any suitable document processing device can be used.

Given the expense in obtaining and maintain MFPs, devices are frequently shared among users via a data network. Users may send document processing jobs, such as a print request, to one or more networked devices. In a typical shared device setting, one or more workstations are connected via a network. When a user wants to print a document, an electronic copy of that document is sent to a document processing device via the network. The user may select a particular device when several are available. The user then walks to the selected device and waits for the printed document to be output. If multiple users send their requests to the same device, the jobs are queued and outputted sequentially.

A user may have to look at one or more documents that have been printed to determine which one is associated with their request. This can be particularly problematic when sensitive information exists in any printed document.

SUMMARY

In accordance with an example embodiment of the subject application, a document processing device receives a document processing command from a mobile data device. The mobile data device specifies at least one electronic document for processing. The user mobile data device captures and digitizes primary gesture data. The document processing device includes a user interface which captures and digitizes a secondary gesture from a device user received at the document processing device. The primary and secondary gesture data is compared, and document processing is selectively enabled as a result of the comparison.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

In accordance with the subject application, security is provided for network document processing jobs such that a user can securely commence a document output at a shared device, such as an MFP, by providing unique information to the device which was supplied earlier by the user. While passwords may be associated with a document and entered by a user at an MFP to commence printing, this presents disadvantages. A user's commonly-used password or passwords may be subject to discovery by another user. Job specific passwords can require a user to remember long strings of characters. A user may forget job specific or temporary password and have to return to their workstation to regain it or generate a new one. Or, a user may write down a temporary password, making it possible for someone to intercept it. Writing down a password, even a temporary password, can lead to further inconveniences. The user may misplace their note, creating a security risk, or mis-transcribe the password, requiring a password to be reset by the user.

While long strings of numbers can be difficult to retain, a user can more readily repeat a gesture-based input, such as a particular shape, a handwritten entry, a signature, or an identifying mark. Given that everyone's writing or sketching selections vary between persons, there will be subtleties between gesture renderings, even of the same or similar gesture, between various users. It will be understood that any suitable gesture input device is suitably used in conjunction with the teachings herein, including any suitable touch-sensitive mechanism or video input for obtaining one or more gestures from a user.

Figure 1:
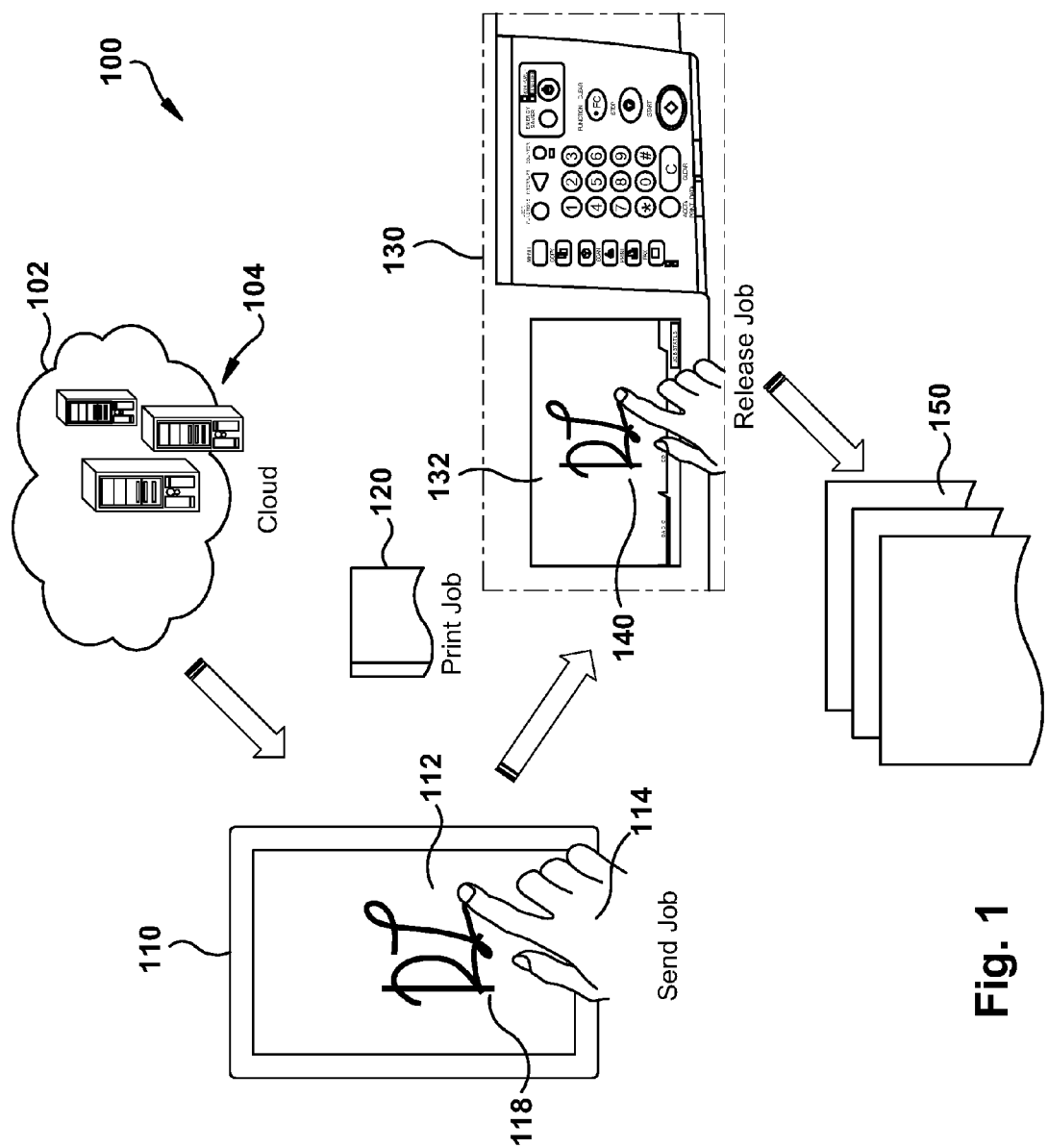
FIG. 1 an example embodiment of a gesture-based system for processing of document processing tasks.

Referring to FIG. 1, illustrated is an example embodiment of a gesture-based system 100 for processing of document processing tasks by multiple users over one or more shared devices. In the illustrated example, electronic files are suitably saved to and recalled from a data cloud 102, suitably comprised of one or more servers 104. A user suitably has access to a data device, such as a networked computer, tablet, smartphone, workstation, notebook, smart watch, or any other suitable device. In the illustrated example of FIG. 1, tablet 110 includes a touchscreen 112 that suitably accepts input from pressure, such as via a stylus or finger press as illustrated. A user suitably uses hand 114 to create a graphical element 118 on touchscreen 112 which is digitized for future use as will be detailed below. The graphical element 118 is suitably associated with a document selection and document processing commands issued by the user via the same device. By way of particular example, a user may select a particular document or documents embodied in electronic files stored in data cloud 102.

The user may also select parameters for processing each selected document. By way of example, a user may specify a number of copies, duplex mode, color mode, such as black-and-white, grayscale, twin color, and the like. Other user selections may include paper type, paper size, stapling, collating, hole-punching, binding or the like.

When a user commences a document processing operation, a default device or devices may be automatically implemented, or a listing of one or more document processing devices, such as MFPs, displayed. This listing is suitably from previously set device options, or obtained via polling for available devices. Such polling may be in conjunction with a polling of capabilities of the available devices to determine whether they are candidates for a particular job selected for processing.

In the illustrated example of FIG. 1, electronic files associated with a print job 120 are communicated to one or more document processing devices, such as an MFP. A MFP user interface 130 includes a gesture input, suitably comprised of touch screen 132. The user enters a graphical element 140 on touch screen 132. That graphical element 140 that is input on the touch screen 132 is checked against the graphical element 118 that was entered previously on tablet 110. If sufficient coincidence is determined, the device proceeds to process the print job 120 as requested. The particulars of the forgoing will be described in further detail, below. Sufficient coincidence may be more loosely or more tightly controlled as may be desired for a particular level of security suitably set by a system administrator. Once coincidence has been determined, document processing is completed and job 150 is released.

It will be appreciated that device selection, document selection, finishing selections, and the like, alone or in combination, are suitably linked to a particular gesture, such that a user need only approach an MFP and enter their gesture to trigger completion of the document processing operation associated with it.

Figure 2:
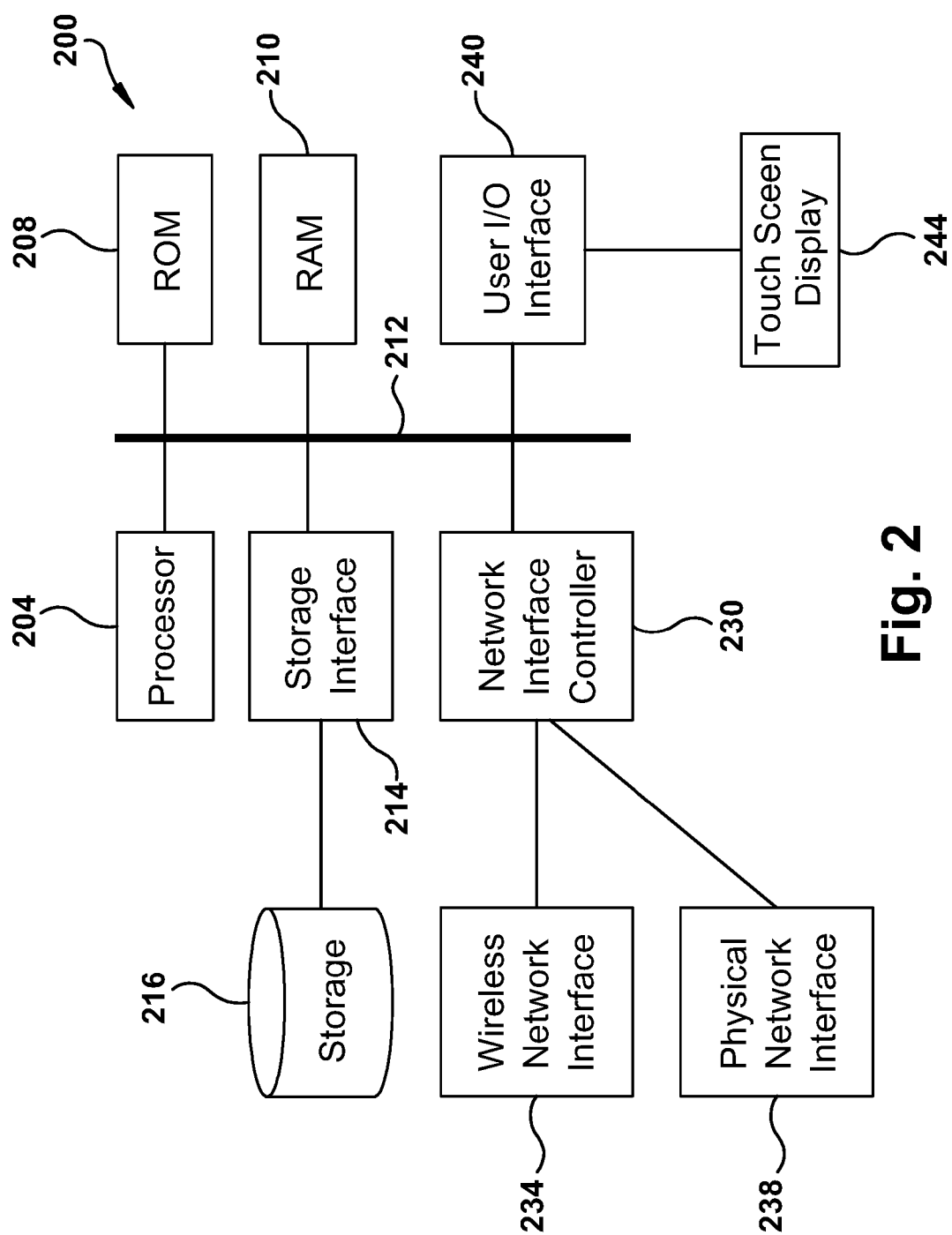
FIG. 2 is an example embodiment of a digital processing system suitably comprised within document device.

Turning now to FIG. 2, illustrated is an example of a digital processing system 200 suitably comprised within document device, such as an MFP or forming constituent components for any suitable user device, such as tablet. Included are one or more processors, such as that illustrated by processor 204. Each processor is suitably associated with non-volatile memory, such as ROM 208 and random access memory (RAM) 210, via a data bus 212.

Processor 204 is also in data communication with a storage interface 214 for reading or writing to a storage 216, suitably comprised of a hard disk, optical disk, solid-state disk, cloud-based storage, or any other suitable data storage as will be appreciated by one of ordinary skill in the art.

Processor 204 is also in data communication with a network interface controller (NIC) 230 which provides a data path to any suitable data path, including a wireless data connection via wireless network interface 234 or a physical network via physical network interface 238. Example wireless connections include cellular, WiFi, Bluetooth, near-field communication, wireless universal serial bus (wireless USB), satellite, and the like. Example wired interfaces include Ethernet, USB, IEEE 1394 (FireWire), or the like.

Processor 204 is also in data communication with a user input/output (I/O) interface 240 which provides data communication with user peripherals, such as touch screen display 244, keyboards, mice, track balls, touch screens, or the like.

Figure 3:
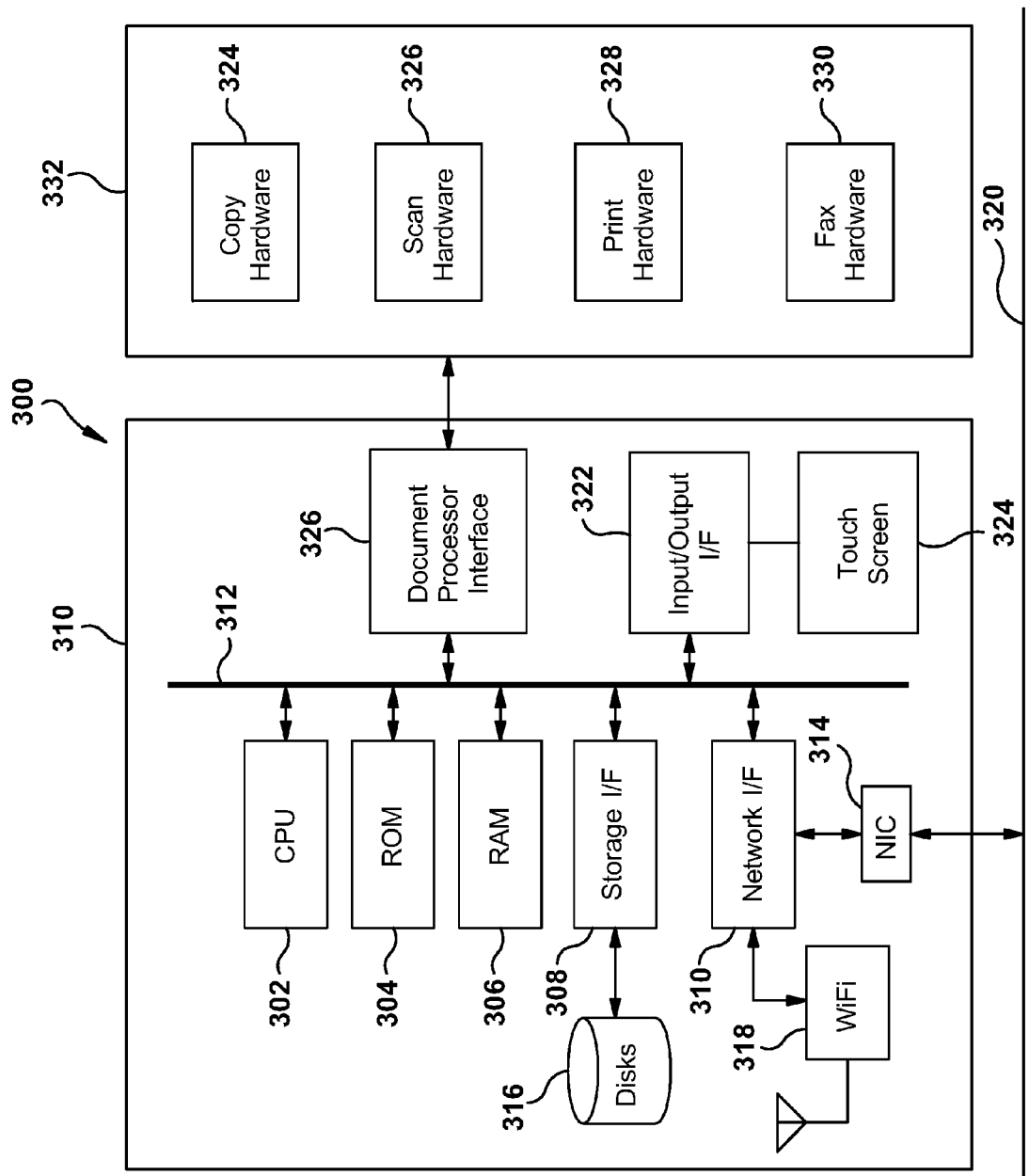
FIG. 3 is an example embodiment of a digital processing system suitably comprised within an MFP.

Turning now to FIG. 3, illustrated is an example of a digital processing system 300 suitably comprised within an MFP. Included in controller 310 are one or more processors, such as that illustrated by processor 302. Each processor is suitably associated with non-volatile memory, such as ROM 304, and random access memory (RAM) 306, via a data bus 312.

Processor 302 is also in data communication with a storage interface 308 for reading or writing to a storage 316, suitably comprised of a hard disk, optical disk, solid-state disk, cloud-based storage, or any other suitable data storage as will be appreciated by one of ordinary skill in the art.

Processor 302 is also in data communication with a network interface 310 which provides an interface to a network interface controller (NIC) 314, which in turn provides a data path to any suitable wired or physical network connection via network interface connection (NIC) 314, or to a wireless data connection via wireless network interface 318. Example wireless connections include cellular, Wi-Fi, Bluetooth, NFC, wireless universal serial bus (wireless USB), satellite, and the like. Example wired interfaces include Ethernet, USB, IEEE 1394 (FireWire), telephone line, or the like. NIC 314 and wireless network interface 318 suitably provide for connection to an associated network 320.

Processor 302 is also in data communication with a user input/output (I/O) interface 322 which provides data communication with user peripherals, such as touch screen 324, displays, keyboards, mice, cameras, track balls, touch screens, or the like. Also in data communication with data bus 312 is a document processor interface 326 suitable for data communication with MFP functional units. In the illustrated example, these units include copy hardware 324, scan hardware 326, print hardware 328 and fax hardware 330 which together comprise MFP functional hardware 332. It will be understood that functional units are suitably comprised of intelligent units, including any suitable hardware or software platform.

Figure 4:
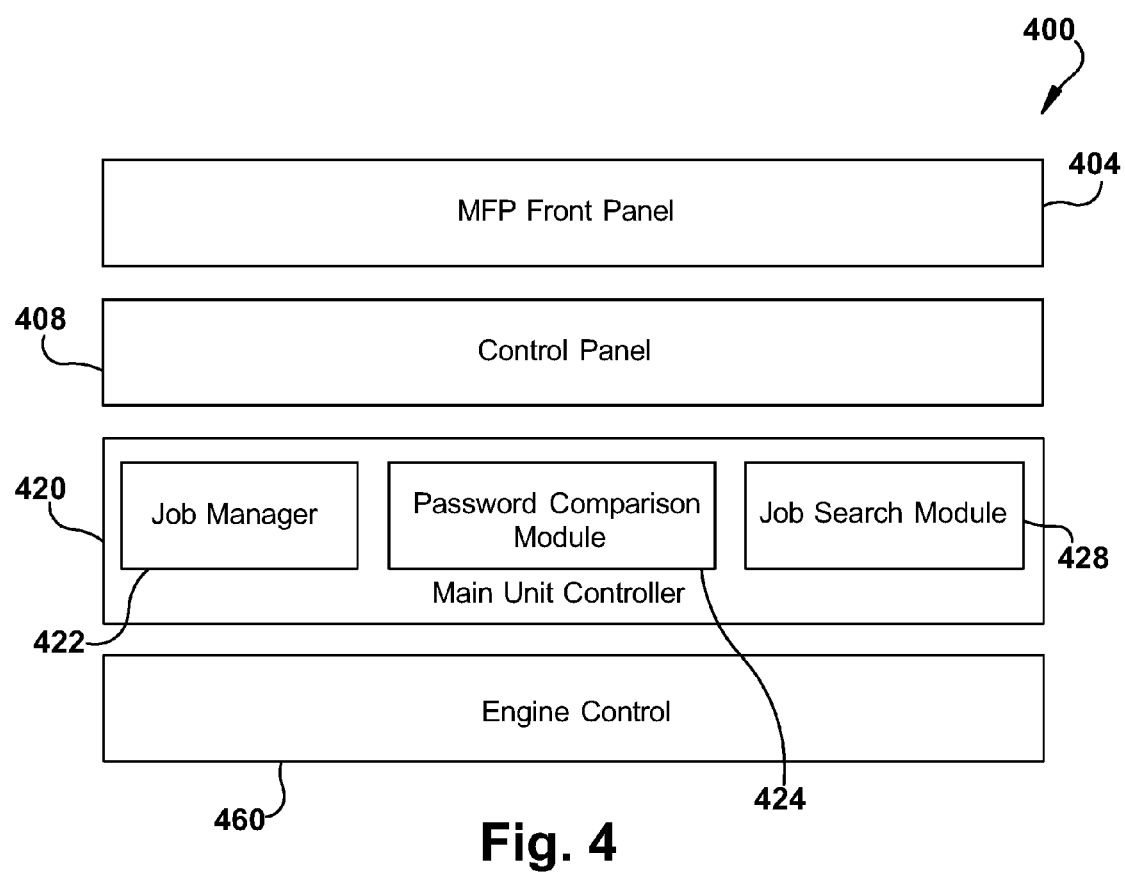
FIG. 4 is an example embodiment of a software module block diagram.

Referring now to FIG. 4, illustrated is an example embodiment of a software module block diagram 400 for accomplishing the MFP functionality noted above. MFP front panel control module 404 accomplishes input and output, such as with user interface 130 detailed above. Control panel module 408 handles other inputs, such as keypads, Bluetooth, near field communications, or the like. Main unit controller module 420 includes job manager module 422 for managing job queuing, execution and the like. Main unit controller module 420 also includes password comparison module 424 for comparing inputs, such as gesture inputs, and job search module 428 for locating electronic files needed for job completion.

Figure 5:
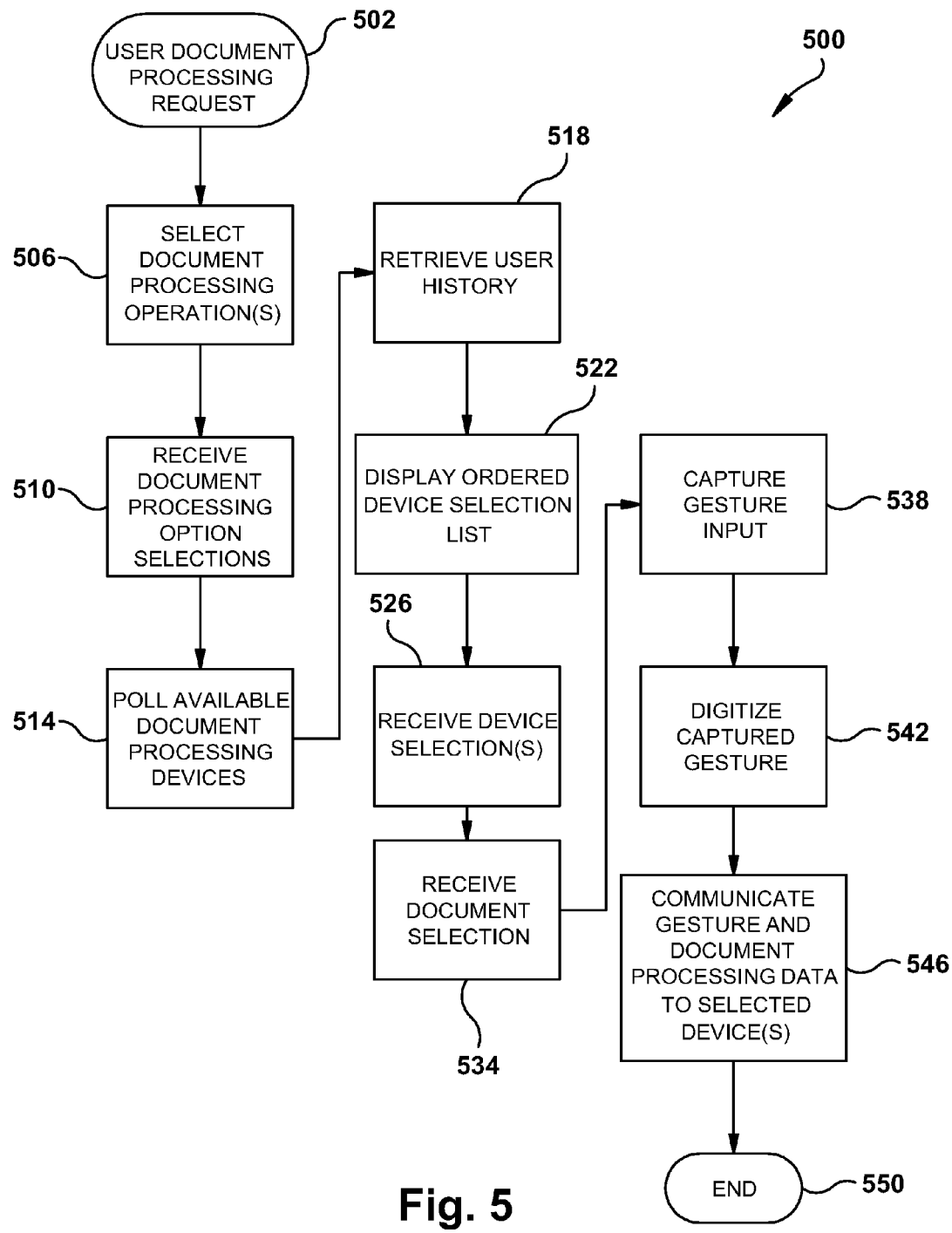
FIG. 5 is an example embodiment of a flowchart for operation within a user device to commence a document processing job.

FIG. 5 illustrates an example embodiment of a flowchart 500 for operation within a user device to commence a document processing job. The process commences at block 502 with a user request to complete a document processing operation. The particular operation or operations are selected at 506, along with document processing options at block 510. A poll is suitably made for available document processing devices at block 514. The polling may result in all available devices, or may suitably be limited to those devices to which the user has access or which include sufficient capabilities to complete the requested operation. User history is suitably checked at block 518 to facilitate incorporation of particular user preferences, such as from prior jobs that were completed by that user. The above-described information is suitably used to generate an ordered device list at block 522, from which a user may select one or more devices for document processing at block 526. The user's document selection is obtained at block 534. Documents may be resident or otherwise available on the user's device, or available in server or cloud storage. Document selection may include the document itself, or address or location data to allow for subsequent retrieval. Documents may also already reside on a selected MFP. The user's gestures are captured at block 538, and digitized at block 542. Digitized, captured gesture data is communicated to the targeted document processing devices, along with instructions for job processing and job content at block 546, and the process suitably ends at block 550.

Figure 6:
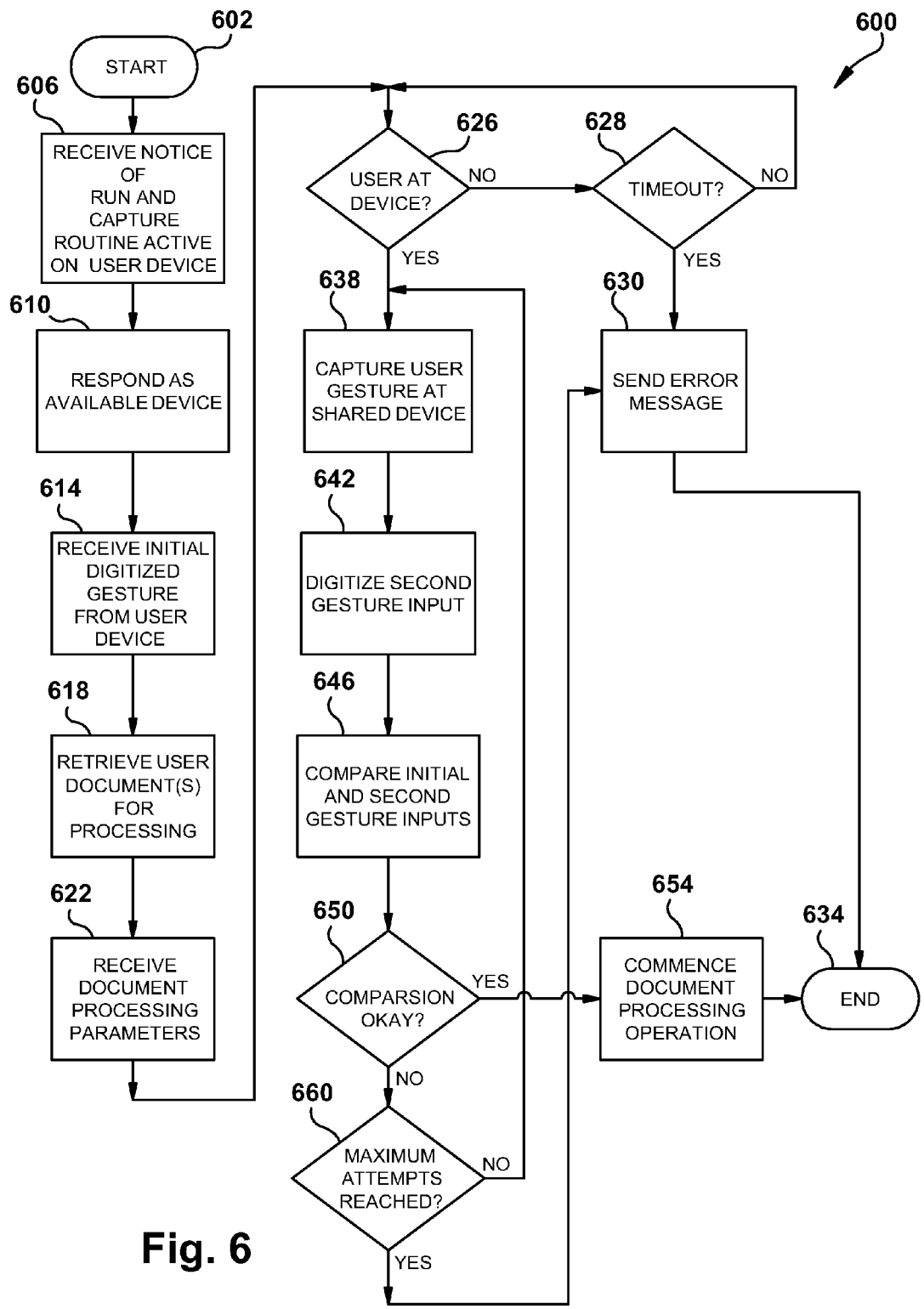
FIG. 6 is an example embodiment of a flowchart for operation within a document processing device.

FIG. 6 is an example embodiment of a flowchart 600 for operation within a document processing device, such as an MFP. The process commences at block 602, and notice is received at block 606 relative to a remote document processing operation commencement. The system suitably response as available at block 610, suitably in connection with a device polling which may be in connection with a polling of device capabilities relative to the task at hand. Digitized gesture data is received at block 614, which data may suitably be coupled with other data relating to the electronic document or documents to be processed and the parameters for processing. If not already present, documents are suitably retrieved at block 618, such as from the user device, from a server or from cloud storage. Document processing parameters are received at block 622.

Next, a check is made at block 622 to determine if and when the user associated with sending the job is present at the device. If the user is not present at the device, passing of a preselected duration may preclude job processing, thus requiring retransmission. A check for such a timeout is made at 628. If the limit has not yet been reached, the process returns to block 626 to check for the user again. If the duration has timed out, an error message is suitably sent at block 630, and the process ends at block 634.

If a determination is made at block 626 that the user is at the device, the user's gesture is captured at the device at block 638, digitized at block 642 and compared with the digitized gesture received earlier at block 646. A test is made at block 650 to determine if the gestures are sufficiently similar as indicated by a comparison between their digitized values. If the comparison is acceptable, processing of the document is commenced at block 654 with the document and processing parameters received earlier. The process then suitably ends at block 634 to be recommenced when another document processing operation is requested. If the comparison is not deemed to be sufficiently close to be acceptable, a test is suitably made at block 660 to determine if a preselected number of attempts has been made. If so, the process suitably generates an error message at block 630 and terminates at block 634. If not, the system returns to block 638 and another gesture is captured, digitized and analyzed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
    an input operable to receive a document processing command from an associated mobile data device,
        the input further operable to receive document data corresponding to at least one selected electronic document,
        the input further operable to receive document processing instructions corresponding to the at least one selected electronic document; and
        the input further operable to receive primary gesture data associated with received document data, the primary gesture data corresponding to a digitized primary gesture captured from a user by the mobile data device;
    a user interface operable to capture a secondary gesture from a user; and
    a processor and associated memory operable to create digitized secondary gesture data corresponding to the secondary gesture captured by the user interface,
        the processor further operable to compare the primary gesture data with the secondary gesture data,
        the processor further operable to enable processing of the at least one electronic document pursuant to received document processing instructions in accordance with a positive correlation of the primary gesture data with the secondary gesture data, and
        the processor is further operable for deleting the primary gesture data and the secondary gesture data after completion of processing of the at least one electronic document.

2. The system of claim 1, wherein the processor is further operable to generate an error signal when a comparison of the primary gesture data with the secondary gesture data indicates a lack of correlation,
    wherein the user interface is further operable to generate a user prompt in accordance with the error signal;
    wherein the user interface is further operable to capture at least one gesture retry from the device user in accordance with the prompt,
    wherein the processor is further operable to create digitized gesture retry data,
    wherein the processor is further operable to compare the primary gesture data with the gesture retry data, and
    wherein the processor is further operable to selectively enable processing of the at least one electronic document in accordance with a comparison of the primary gesture data with the gesture retry data.

3. The system of claim 2 wherein the processor is further configured to disable processing of the document data when a comparison of the primary gesture data with the gesture data retry data indicates a lack of correlation.

4. The system of claim 3 wherein the user interface is comprised of a touchscreen.

5. The system of claim 4 wherein the processor is further operable to generate list data corresponding to a list of candidate document processing devices associated with a user in accordance with a positive correlation of the primary gesture data with the secondary gesture data, and further comprising:
    an output operable to communicate the list data to the mobile data device, and
    wherein the input is further operable to receive selection data corresponding to at least one document processing device selected by the user from the list data, and
    wherein the processor is further operable to complete processing of the at least one electronic document in accordance with the selection data.

6. The system of claim 5 wherein the output is further operable to receive the electronic document data from a networked storage device in accordance with received gesture data.

7. A method comprising:
receiving a document processing command from an associated mobile data device;
receiving document data corresponding to at least one selected electronic document;
receiving document processing instructions corresponding to the at least one selected electronic document;
receiving primary gesture data associated with received document data, the primary gesture data corresponding to a digitized primary gesture captured from a user by the mobile data device;
capturing a secondary gesture from a device user via a user interface;
digitizing, via a processor and associated memory, secondary gesture data corresponding to the secondary gesture captured by the user interface;
comparing the primary gesture data with the secondary gesture data;
enabling processing of the at least one electronic document pursuant to received document processing instructions in accordance with a positive correlation of the primary gesture data with the secondary gesture data; and
deleting primary gesture data and the secondary gesture data after completion of processing of the at least one electronic document.

8. The method of claim 7 further comprising:
generating an error signal when a comparison of the primary gesture data with the secondary gesture data indicates a lack of correlation;
generating a user prompt on the user interface in accordance with the error signal;
capturing, via the user interface, at least one gesture retry from the device user in accordance with the prompt;
generating gesture retry data from a captured gesture retry;
comparing the primary gesture data with the gesture retry data; and
selectively enabling processing of the at least one electronic document in accordance with a comparison of the primary gesture data with the gesture retry data.

9. The method of claim 8 further comprising disabling processing of the document data when a comparison of the primary gesture data with the gesture data retry data indicates a lack of correlation.

10. The method of claim 7 further comprising capturing the secondary gesture data from a touchscreen.

11. The method of claim 7 further comprising:
generating list data corresponding to a list of candidate document processing devices associated with user in accordance with the primary gesture data;
communicating the list data to the mobile data device;
receiving selection data corresponding to at least one document processing device selected by the user from the list data; and
processing of the at least one electronic document in accordance with the selection data.

12. The method of claim 11 further comprising receiving the electronic document data from a networked storage device in accordance with one or more of the primary gesture data, the secondary gesture data, or the document data.

13. A system comprising:
a mobile data device including,
a memory,
a mobile device user interface, including a mobile device touch screen operable to capture a primary gesture from an associated user,
the mobile device user interface operable to receive a user request to perform a document processing operation on at least one remote document processing device,
the mobile device user interface further operable to receive document processing instructions from the associated user, and
the mobile device user interface further operable to receive electronic document data corresponding to at least one selected electronic document,
a mobile device processor operable to generate primary, single use, digitized gesture information uniquely associated with the electronic document data and the document processing instructions from a gesture captured via the touchscreen,
a wireless data interface operable to communicate digitized primary gesture information data corresponding to the document processing instructions and the electronic document data to an associated document processing device,
the wireless data interface further operable to communicate user request data corresponding to the user request to the document processing device to conditionally commence a document processing operation in accordance with document processing instructions after a correlation with the digitized gesture, and
the mobile device processor operable to delete the digitized gesture information after communication of the user request data.

14. The system of claim 13 further comprising:
a document processing device including,
an input operable to receive the digitized gesture information, the data corresponding to the document processing instructions and the electronic document data from the mobile data device,
a document processing device user interface operable to capture a secondary gesture from the device user; and
a document processing device processor and associated memory operable to create digitized secondary gesture data corresponding to a gesture captured by the document processor user interface,
wherein the document processing device processor is further operable to compare the primary gesture data with the secondary gesture data, and
wherein the document processing device processor is further operable to selectively enable processing of the at least one electronic document in accordance with a comparison of the primary gesture data with the secondary gesture data, the documents processing instructions and the electronic document data.

15. The system of claim 14 wherein the processor of the document processing device is further operable for terminating the document processing request when no gesture is captured by the document processing device user interface after a selected duration.

16. The system of claim 14 wherein the document processing device is operable to retrieve an electronic document from an associated networked storage device in accordance with the electronic document data.

17. The system of claim 14 wherein the document processing device processor is further operable to generate an error signal when the comparison of the primary gesture data with the secondary gesture data indicates a lack of correlation,
- wherein the document processing device user interface is further operable to generate a user prompt in accordance with the error signal;
- wherein the document processing device user interface is further operable to capture at least one gesture retry in accordance with the prompt,
- wherein the document processing device processor is further operable to create digitized gesture retry data,
- wherein the document processing device processor is further operable to compare the primary gesture data with the gesture retry data, and
- wherein the document processing device processor is further operable to selectively enable processing of the at least one electronic document in accordance with a comparison of the primary gesture data with the gesture retry data.

18. The system of claim 13 wherein the wireless data interface of the mobile data device includes is further operable to initiate a probe and receive data corresponding to available document processing devices in accordance with the probe.

* * * * *